(12) United States Patent
Maeda

(10) Patent No.: US 10,991,940 B2
(45) Date of Patent: Apr. 27, 2021

(54) GRAPHITE-BASED MATERIAL FOR LITHIUM ION SECONDARY BATTERIES AND METHOD FOR PRODUCING THE SAME, AND NEGATIVE ELECTRODE AND LITHIUM ION SECONDARY BATTERY

(71) Applicant: NEC CORPORATION, Tokyo (JP)

(72) Inventor: Katsumi Maeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 65 days.

(21) Appl. No.: 16/346,733

(22) PCT Filed: Oct. 5, 2017

(86) PCT No.: PCT/JP2017/036216
§ 371 (c)(1),
(2) Date: May 1, 2019

(87) PCT Pub. No.: WO2018/083937
PCT Pub. Date: May 11, 2018

(65) Prior Publication Data
US 2020/0058932 A1   Feb. 20, 2020

(30) Foreign Application Priority Data
Nov. 2, 2016   (JP) .............................. JP2016-215114

(51) Int. Cl.
| | |
|---|---|
| H01M 4/58 | (2010.01) |
| H01M 4/36 | (2006.01) |
| H01M 4/587 | (2010.01) |
| H01M 10/0525 | (2010.01) |
| H01M 10/0567 | (2010.01) |
| H01M 10/0568 | (2010.01) |

(52) U.S. Cl.
CPC ........... *H01M 4/366* (2013.01); *H01M 4/587* (2013.01); *H01M 4/5825* (2013.01); *H01M 10/0525* (2013.01); *H01M 10/0567* (2013.01); *H01M 10/0568* (2013.01); *H01M 2300/0025* (2013.01)

(58) Field of Classification Search
CPC .... H01M 4/366; H01M 4/5825; H01M 4/587; H01M 10/0525; H01M 10/0567; H01M 10/0568; H01M 2300/0025; H01M 4/0471; H01M 4/139; H01M 4/133; Y02P 70/50; Y02E 60/10
See application file for complete search history.

(56) References Cited

U.S. PATENT DOCUMENTS

2015/0162644 A1*   6/2015   Fujii .................... H01M 4/134
429/199

FOREIGN PATENT DOCUMENTS

| JP | 2009-64574 A | 3/2009 |
|---|---|---|
| JP | 2009-158464 A | 7/2009 |
| JP | 2012-182130 A | 9/2012 |
| JP | 2014-78360 A | 5/2014 |

(Continued)

OTHER PUBLICATIONS

International Search Report for PCT/J[2017/036216 dated Dec. 5, 2017 [PCT/ISA/210].

*Primary Examiner* — Cynthia K Walls

(57) ABSTRACT

A graphite-based material for a lithium ion secondary battery, the graphite-based material comprising a coating film on at least a part of the surface of a graphite particle, the coating film comprising a lithium fluorophosphate compound having a specific composition.

9 Claims, 1 Drawing Sheet

(56) References Cited

FOREIGN PATENT DOCUMENTS

| JP | 2015-2122 A | 1/2015 |
| JP | 2015-122264 A | 7/2015 |
| JP | 2016-81708 A | 5/2016 |
| WO | 2012/147818 A1 | 11/2012 |

* cited by examiner

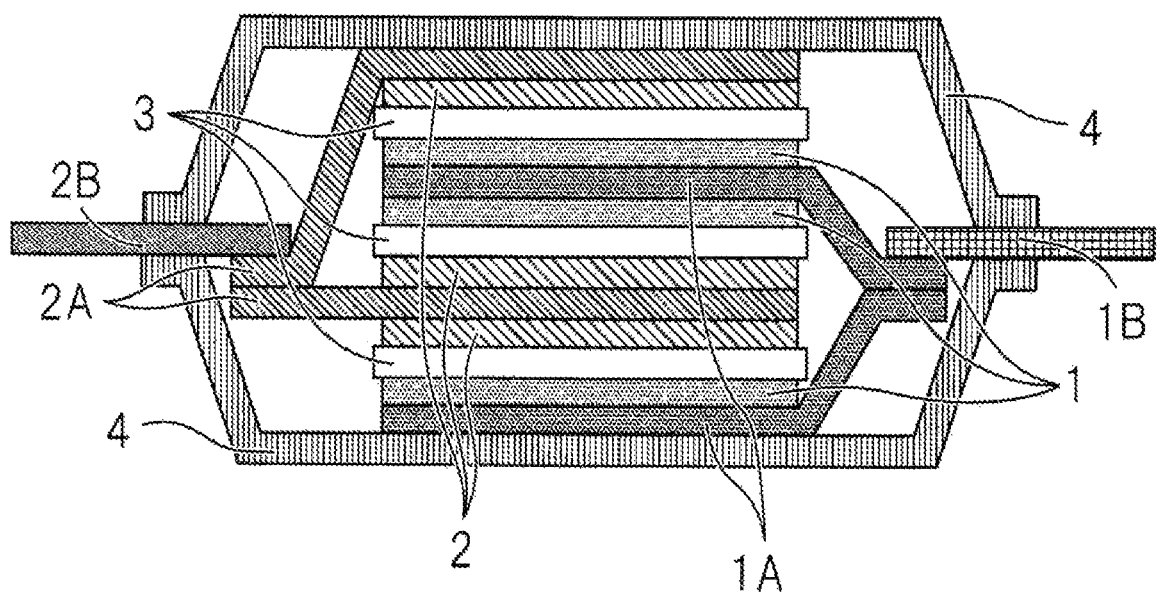

GRAPHITE-BASED MATERIAL FOR LITHIUM ION SECONDARY BATTERIES AND METHOD FOR PRODUCING THE SAME, AND NEGATIVE ELECTRODE AND LITHIUM ION SECONDARY BATTERY

CROSS REFERENCE TO RELATED APPLICATIONS

This application is a National Stage of International Application No. PCT/JP2017/036216, filed on Oct. 5, 2017, which claims priority from Japanese Patent Application No. 2016-215114, filed on Nov. 2, 2016, the contents of all of which are incorporated herein by reference in their entirety.

TECHNICAL FIELD

The present invention relates to a graphite-based material suitable for a lithium ion secondary battery and a method for producing the graphite-based material, and a negative electrode and a lithium ion secondary battery.

BACKGROUND ART

Lithium ion secondary batteries have been put into practical use as a battery for small electronic devices such as notebook computers and cellular phones because of their advantages such as high energy density, small self-discharge, and excellent long-term reliability. In recent years, development of lithium ion secondary batteries has progressed for batteries for electrical vehicles, for household use, and for power storage.

For lithium ion secondary batteries, carbon materials such as graphite are used as a negative electrode active material and solutions containing a lithium salt such as $LiPF_6$ as an electrolyte dissolved in a linear or cyclic carbonate solvent are used as an electrolytic solution.

Such lithium ion secondary batteries are required to have higher energy density and excellent charge rate characteristics allowing charging in short time even in using a battery with high energy density, and improvement in the charge rate characteristics has been studied.

For example, Patent Literature 1 discloses a secondary battery including two negative electrode layers on a negative electrode current collector, and having a structure in which the first negative electrode layer closer to the negative electrode current collector includes artificial graphite and the second negative electrode layer distant from the negative electrode current collector includes natural graphite, the structure enhancing the charge rate characteristics of the second negative electrode layer compared to those of the first negative electrode layer.

Patent Literature 2 discloses enhancement of charge rate characteristics through coating an edge portion of a graphite material in a negative electrode active material with at least one selected from the group consisting of Si compounds, Sn compounds, and soft carbon.

Patent Literature 3 discloses, on the other hand, a nonaqueous electrolytic solution secondary battery including a positive electrode, a negative electrode, and a nonaqueous electrolytic solution, wherein a coating film containing a specific amount of phosphorus (P) atoms is formed on the surface of a negative electrode active material containing graphite, and the coating film is substantially formed of a compound derived from lithium difluorophosphate contained as a phosphorus-containing film-forming agent in the nonaqueous electrolytic solution. According to the description, this nonaqueous electrolytic solution secondary battery is for the purpose of achieving durability (storage characteristics at high temperatures and charge/discharge cycle characteristics at high temperatures) and input/output characteristics (electroconductivity) in combination at a high level.

CITATION LIST

Patent Literature

Patent Literature 1:
  JP2009-64574A
Patent Literature 2:
  JP2015-2122A
Patent Literature 3:
  JP2014-78360A

SUMMARY OF INVENTION

Technical Problem

However, the method of forming a negative electrode of bilayer structure with different active materials contained and the method of coating an edge portion of planar hexagonal carbon networks of graphite with silicon or the like lead to complicated production processes and thus to increased production cost. In addition, further improvement of charge rate characteristics has been demanded for lithium ion secondary batteries.

An object of the present invention is to provide a lithium ion secondary battery capable of solving the above-mentioned problem with excellent charge rate characteristics; a graphite-based material and negative electrode for the lithium ion secondary battery; and a method for producing the graphite-based material.

Solution to Problem

A graphite-based material for a lithium ion secondary battery according to one aspect of the present invention comprises a coating film on at least a part of the surface of a graphite particle, the coating film comprising a lithium fluorophosphate compound having a mean composition represented by the following composition formula:

$$LiPO_aF_b$$

wherein a and b are, independently of each other, numbers satisfying $2<a\leq3$ and $2<b\leq3$, respectively.

A negative electrode for a lithium ion secondary battery according to another aspect of the present invention comprises the graphite-based material.

A lithium ion secondary battery according to another aspect of the present invention comprises: a positive electrode comprising a positive electrode active material capable of intercalating and deintercalating a lithium ion; a negative electrode comprising a negative electrode active material capable of intercalating and deintercalating a lithium ion; and a nonaqueous electrolytic solution, wherein the negative electrode active material comprises the above graphite-based material.

A method for producing a graphite-based material for a lithium ion secondary battery according to another aspect of the present invention comprises a step of heat-treating a graphite particle in the presence of lithium difluorophosphate to form a coating film comprising a lithium fluorophosphate compound derived from the lithium difluorophosphate on at least a part of the surface of the graphite particle.

Advantageous Effects of Invention

Exemplary embodiments can provide: a lithium ion secondary battery with high charge rate characteristics; a graphite-based material and negative electrode suitable for the lithium ion secondary battery; and a method for producing the graphite-based material.

BRIEF DESCRIPTION OF DRAWING

FIG. 1 is a schematic cross-sectional view illustrating an example of the configuration of the lithium ion secondary battery according to an exemplary embodiment.

DESCRIPTION OF EMBODIMENTS

Now, exemplary modes for implementation of the present invention will be described. Although exemplary configurations preferred in a technical sense for implementation of the present invention are shown in the following description, the configurations are not intended to limit the scope of the invention.

The present inventor has found, as a result of diligent study to solve the above problem, that excellent charge rate characteristics can be achieved for a lithium ion secondary battery through use of a graphite-based material for the negative electrode, the graphite-based material comprising a coating film formed on at least a part of the surface of a graphite particle, the coating film comprising a lithium fluorophosphate compound having a specific composition, and thus completed the present invention.

Although details of the reason for enhancement of charge rate characteristics by formation of a coating film comprising such a lithium fluorophosphate compound on at least a part of the surface of a graphite particle are unclear, it is inferred, for example, that a low-resistance coating film derived, for example, from lithium difluorophosphate used as a film-forming agent is formed on the surface of a graphite particle, and the low-resistance coating film provides an enhanced charge rate. Examples of the lithium fluorophosphate for film formation (film-forming agent) include lithium monofluorophosphate and lithium difluorophosphate, and preferred is lithium difluorophosphate.

A lithium ion secondary battery according to an exemplary embodiment, which uses such a graphite-based material for the negative electrode, has a high charge rate and thus charging time can be shortened even in the case of high capacity, and, moreover, enhanced use efficiency is achieved for a lithium ion secondary battery.

The nonaqueous electrolytic solution in the lithium ion secondary battery preferably comprises lithium hexafluorophosphate and lithium bis(fluorosulfonyl)imide as an electrolyte. The concentration of lithium hexafluorophosphate in the nonaqueous electrolytic solution is preferably 0.3 mol/L or more. The concentration of lithium bis(fluorosulfonyl) imide in the nonaqueous electrolytic solution is preferably 0.1 mol/L or more, and preferably 1.7 mol/L or less. Here, the total electrolyte concentration of the nonaqueous electrolytic solution is preferably 3 mol/L or less, and more preferably 2 mol/L or less.

The nonaqueous electrolytic solution preferably comprises lithium difluorophosphate as an additive, and the content of lithium difluorophosphate in the nonaqueous electrolytic solution is preferably 0.05% by mass to 5% by mass.

Now, the graphite-based material, negative electrode, and lithium ion secondary battery according to an exemplary embodiment will be described in detail.
<Graphite-Based Material Comprising Coating Film Comprising Lithium Fluorophosphate Compound>

The graphite-based material according to an exemplary embodiment comprises a coating film comprising a lithium fluorophosphate compound on at least a part of the surface of a graphite particle.

Examples of the graphite particle to be coated include artificial graphite and natural graphite. A preferred example is a heat-treated graphite material described in Japanese Patent Application No. 2014-063287. In this case, natural graphite or artificial graphite can be used for heat-treatment for the raw material of the graphite material.

A common product of artificial graphite obtained by graphitizing coke or the like can be used. Alternatively, a product of artificial graphite obtained by graphitizing mesophase spherules called mesocarbon microbeads (MCMB) may be used. In addition, a product of artificial graphite heat-treated in a temperature range of 2000 to 3200° C. can be used. Particles of any of these raw material graphites can be used from the viewpoint of packing efficiency, mixability, formability, etc. Examples of the shape of such particles include a sphere, an ellipsoid, and a scale (flake). Common spheroidization may be performed.

These graphite materials are subjected to first heat treatment in an oxidative atmosphere, and then subjected to second heat treatment in an inert gas atmosphere at a temperature higher than that for the first heat treatment step to afford a heat-treated graphite material.

The temperature for the first heat treatment for the graphite material in an oxidative atmosphere can be selected typically from the temperature range of 400 to 900° C. under normal pressure. The duration of the heat treatment is in the range of about 30 minutes to 10 hours. Examples of the oxidative atmosphere include oxygen, carbon dioxide, and air. The oxygen concentration and pressure can be appropriately adjusted.

The first heat treatment is followed by the second heat treatment in an inert gas atmosphere. The second heat treatment is performed at a temperature higher than that for the first heat treatment, and the temperature can be selected typically from the temperature range of 800° C. to 1400° C. under normal pressure. The duration of the heat treatment is in the range of about 1 hour to 10 hours. Examples of the inert gas atmosphere include a noble gas atmosphere such as Ar and a nitrogen gas atmosphere. After the second heat treatment, cleaning can be performed through water washing followed by drying.

The first and second heat treatment steps can be performed sequentially in one heating furnace. In this case, an oxidative atmosphere for the first heat treatment step is replaced with an inert gas and heating is then performed to a temperature for the second heat treatment. Alternatively, the first and second heat treatment steps can be performed separately in two, sequentially disposed heating furnaces. Moreover, a certain interval of time without affecting the surface condition of channels formed may be set between the first heat treatment step and the second heat treatment step, and an additional step such as water washing and drying may be included therebetween.

The average particle diameter of the graphite material as a raw material is preferably 1 μm or larger, more preferably 2 μm or larger, and even more preferably 5 μm or larger from the viewpoint of suppression of side reaction during charging/discharging and reduction of lowering of charge/discharge efficiency, and preferably 40 μm or smaller, more preferably 35 μm or smaller, and even more preferably 30 μm or smaller from the viewpoint of input/output characteristics and electrode production (e.g., smoothness of the surface of an electrode). Here, an average particle diameter refers to a particle diameter at 50% of a cumulative value (median diameter: D50) in a particle size distribution (volume basis) in a laser diffraction/scattering method.

To form a coating film comprising a lithium fluorophosphate compound on the surface of a graphite particle, for example, a graphite particle is heat-treated in the presence of lithium difluorophosphate. Thereby, a coating film is formed on at least a part of the surface of the graphite particle. Heat treatment of a graphite particle the surface of which is in contact with lithium difluorophosphate can form a coating film on at least a part of the surface of the graphite particle. To form a coating film on the surface of a graphite particle with interparticle homogeneity, for example, a graphite particle is dispersed in a solution containing lithium difluorophosphate dissolved therein, the solvent is distilled off, and then the residue is heat-treated, which allows homogeneous formation of a coating film on the surface of the graphite particle. Examples of the solvent to dissolve lithium difluorophosphate include acetonitrile, water, and N-methyl-2-pyrrolidone. The heat treatment temperature is preferably 80 to 300° C., and more preferably 120 to 250° C. The duration of heat treatment is preferably 30 minutes to 5 hours, and more preferably 1 hour to 3 hours.

Details of the chemical condition of the coating film comprising a lithium fluorophosphate compound and formed on the surface of the graphite particle are unknown, and hence the coating film was analyzed with X-ray photoelectron spectroscopy (XPS). The analysis found that the elemental composition differed from that of lithium difluorophosphate used for film formation. It is inferred from the finding that lithium difluorophosphate reacts on the surface of the graphite particle through heat treatment and thereby a low-resistance coating film is formed.

The low-resistance coating film preferably comprises a lithium fluorophosphate compound comprising element lithium (Li), element fluorine (F), element phosphorus (P), and element oxygen (O), and having a mean composition represented by the following composition formula:

wherein a and b are, independently of each other, numbers satisfying 2<a≤3 and 2<b≤3, respectively.

From the viewpoint of sufficiently exerting the effect of formation of the coating film, a and b in the formula are, preferably, each independently in the range of 2.1 to 3 (2.1≤a≤3), more preferably, each independently in the range of 2.3 to 3 (2.3≤a≤3), and, even more preferably, each independently in the range of 2.5 to 3 (2.5≤a≤3).

The mean composition can be determined by surface analysis of a particle of the graphite-based material with X-ray photoelectron spectroscopy (XPS). Measurements obtained can be normalized with respect to a measurement (a measurement before heat treatment) for a film-forming agent (e.g., lithium difluorophosphate).

It is preferable for the graphite-based material according to an exemplary embodiment that the composition of a particle of the graphite-based material as determined by surface analysis using X-ray photoelectron spectroscopy (XPS) is such that: when the total amount of element lithium (Li), element phosphorus (P), element fluorine (F), element oxygen (O), and element carbon (C) is defined as 100 atomic %, the ratio of Li be 0.7 to 3.5 atomic %, the ratio of P be 0.7 to 3.5 atomic %, the ratio of F be 2.5 to 10 atomic %, and the ratio of O be 2.5 to 10 atomic %.

It is sufficient for the coating film in the graphite-based material according to an exemplary embodiment to be covering at least a part of the surface of the graphite particle, and the coating film may be covering the whole of the surface or a part of the surface. From the viewpoint of sufficiently obtaining the effect of formation of the coating film, the ratio of C as determined by the surface analysis is preferably 93.6 atomic % or less, and more preferably 90 atomic % or less. Even if the ratio of C as determined by the surface analysis is 73 atomic % or more, the effect of formation of the coating film can be obtained.

<Negative Electrode>

For the negative electrode in the lithium ion secondary battery according to an exemplary embodiment, for example, a negative electrode in which a negative electrode active material layer comprising a negative electrode active material and a binder is formed to cover a negative electrode current collector can be used. The binder binds the negative electrode active material and the current collector, and binds the negative electrode active material itself.

For the negative electrode active material, a material containing a graphite particle with a coating film comprising the above lithium fluorophosphate compound (hereinafter, referred to as "coated-graphite particle", as appropriate) on at least a part of the surface is used. For the graphite particle to be coated, a particle of natural graphite or artificial graphite can be used.

Additionally, the negative electrode active material may comprise a carbonaceous material capable of intercalating and deintercalating a lithium ion. Examples include carbonaceous materials such as graphite materials (artificial graphite, natural graphite), carbon blacks (acetylene black, furnace black), coke, mesocarbon microbeads, hard carbon, and graphite. One of the negative electrode active materials may be used singly, or two or more thereof may be used in any combination at any ratio.

The negative electrode active material may be used in a mixture with a silicon-containing negative electrode active material (preferably, silicon or a silicon oxide).

The content of the coated graphite particle in the negative electrode active material is, from the viewpoint of sufficiently obtaining the effect, preferably 60 to 100% by mass, more preferably 70 to 100% by mass, even more preferably 80 to 100% by mass, and the most preferably 100% by mass (i.e., use only of the coated graphite particle as the negative electrode active material) in the negative electrode active material.

The binder for negative electrodes is not limited, and examples thereof which can be used include polyvinylidene fluorides, vinylidene fluoride-hexafluoropropylene copolymers, vinylidene fluoride-tetrafluoroethylene copolymers, styrene-butadiene copolymer rubbers (SBR), polytetrafluoroethylenes, polypropylenes, polyethylenes, polyimides, and polyamideimides. Among them, polyimides, polyamideimides, SBRs, polyacrylic acids (including lithium salts, sodium salts, and potassium salts neutralized with an alkali), and carboxymethyl cellulose (including lithium salts, sodium salts, and potassium salts neutralized with an alkali) are preferred because of their high binding properties. The amount of the binder for negative electrodes to be used is, from the viewpoint of binding strength and energy density, which are in trade-off relation to the amount of the binder, preferably 5 to 25 parts by mass based on 100 parts by mass of the negative electrode active material.

The negative electrode current collector is not limited, and any common negative electrode current collector for a typical lithium ion secondary battery can be used. For a material of the negative electrode current collector, for example, a metal material such as copper, nickel, and SUS can be used. Among them, copper is particularly preferred for ease of processing and cost. It is preferable that the negative electrode current collector have been roughened in advance. Examples of the shape of the negative electrode current collector include a foil, a sheet, and a mesh. In addition, a current collector with holes such as an expanded metal and a punched metal can be used.

In a method for producing the negative electrode, for example, a mixture of the above-described negative electrode active material and binder, various aids, as necessary, and a solvent is kneaded to prepare a slurry, and the slurry is applied onto a current collector, and then dried and pressurized as necessary to produce the negative electrode.

<Lithium Ion Secondary Battery>

The lithium ion secondary battery according to an exemplary embodiment comprises: a positive electrode comprising a positive electrode active material capable of intercalating and deintercalating a lithium ion; a negative electrode comprising a negative electrode active material capable of intercalating and deintercalating a lithium ion; and a nonaqueous electrolytic solution. For this negative electrode, the above negative electrode can be used.

<Positive Electrode>

For the positive electrode in the lithium ion secondary battery according to an exemplary embodiment, for example, a positive electrode in which a positive electrode active material layer comprising a positive electrode active material and a binder for positive electrodes is formed to cover a positive electrode current collector can be used.

For the positive electrode active material, a lithium composite metal oxide comprising a transition metal such as cobalt, manganese, and nickel, and lithium can be used.

Specific examples of the lithium transition metal composite oxide include $LiCoO_2$, $LiMnO_2$, $LiMn_2O_4$, $LiNiO_2$, $LiCo_{1-x}Ni_xO_2$ (0.01<x<1), $LiNi_{1/2}Mn_{3/2}O_4$, $LiNi_xCo_yMn_zO_2$ (x+y+z=1), and $LiNi_{0.5}Mn_{1.5}O_4$. For the positive electrode active material, a lithium-containing olivine-type phosphate such as $LiFePO_4$ can be used.

In addition, lithium composite metal oxides in which Li is present more than the stoichiometric composition of the above lithium composite metal oxides are included. Examples of the lithium composite metal oxide with excessive Li include $Li_{1+a}Ni_xMn_yO_2$ (0<a≤0.5, 0<x<1, 0<y<1), $Li_{1+a}Ni_xMn_yM_zO_2$ (0<a≤0.5, 0<x<1, 0<y<1, 0<z<1, M is Co or Fe), and $Li_\alpha Ni_\beta Co_\gamma Al_\delta O_2$ (1≤α≤1.2, β+γ+δ=1, β≥0.7, γ≤0.2).

To enhance cycle characteristics and safety or to enable use at a high charging potential, a part of a lithium composite metal oxide may be replaced with another element. For example, a part of cobalt, manganese, or nickel may be replaced with at least one or more elements such as Sn, Mg, Fe, Ti, Al, Zr, Cr, V, Ga, Zn, Cu, Bi, Mo, and La, or a part of oxygen may be replaced with S or F, or the surface of the positive electrode may be coated with a compound containing these elements.

Specific examples of the composition of the lithium composite metal oxide according to an exemplary embodiment include $LiMnO_2$, $LiCoO_2$, $LiNiO_2$, $LiMn_2O_4$, $LiCo_{0.8}Ni_{0.2}O_2$, $LiNi_{1/2}Mn_{3/2}O_4$, $LiNi_{1/3}Co_{1/3}Mn_{1/3}O_2$ (abbreviated as NCM111), $LiNi_{0.4}Co_{0.3}Mn_{0.3}O_2$ (abbreviated as NCM 433), $LiNi_{0.5}Co_{0.2}Mn_{0.3}O_2$ (abbreviated as NCM 523), $LiNi_{0.5}Co_{0.3}Mn_{0.2}O_2$ (abbreviated as NCM 532), $LiFePO_4$, $LiNi_{0.8}Co_{0.15}Al_{0.05}O_2$, $LiNi_{.8}Co_{0.1}Mn_{0.1}O_2$, $Li_{1.2}Mn_{0.4}Ni_{0.4}O_2$, $Li_{1.2}Mn_{0.6}Ni_{0.2}O_2$, $Li_{1.19}Mn_{0.52}Fe_{0.22}O_{1.98}$, $Li_{1.21}Mn_{0.46}Fe_{0.15}Ni_{0.15}O_2$, $LiMn_{1.5}Ni_{0.5}O_4$, $Li_{1.2}Mn_{0.4}Fe_{0.4}O_2$, $Li_{1.21}Mn_{0.4}Fe_{0.2}Ni_{0.2}O_2$, $Li_{1.26}Mn_{0.37}Ni_{0.22}Ti_{0.15}O_2$, $LiMn_{1.37}Ni_{0.5}Ti_{0.13}O_{4.0}$, $Li_{1.2}Mn_{0.56}Ni_{0.17}Co_{0.07}O_2$, $Li_{1.2}Mn_{0.54}Ni_{0.13}Co_{0.13}O_2$, $Li_{1.2}Mn_{0.56}Ni_{0.17}Co_{0.07}O_2$, $Li_{1.2}Mn_{0.54}Ni_{0.13}Co_{0.13}O_2$, $LiNi_{0.8}Co_{0.15}Al_{0.05}O_2$, $LiNi_{0.5}Mn_{1.48}Al_{0.02}O_4$, $LiNi_{0.5}Mn_{1.45}Al_{0.05}O_{3.9}F_{0.05}$, $LiNi_{0.4}Co_{0.2}Mn_{1.25}Ti_{0.15}O_4$, $Li_{1.23}Fe_{0.15}Ni_{0.15}Mn_{0.46}O_2$, $Li_{1.26}Fe_{0.11}Ni_{0.11}Mn_{0.52}O_2$, $Li_{1.2}Fe_{0.20}Ni_{0.20}Mn_{0.40}O_2$, $Li_{1.29}Fe_{0.07}Ni_{0.14}Mn_{0.57}O_2$, $Li_{1.26}Fe_{0.22}Mn_{0.37}Ti_{0.15}O_2$, $Li_{1.29}Fe_{0.07}Ni_{0.07}Mn_{0.57}O_{2.8}$, $Li_{1.30}Fe_{0.04}Ni_{0.07}Mn_{0.61}O_2$, $Li_{1.2}Ni_{0.18}Mn_{0.54}Co_{0.08}O_2$, $Li_{1.23}Fe_{0.03}Ni_{0.03}Mn_{0.58}O_2$.

Two or more of the lithium composite metal oxides as described above may be used in a mixture, and, for example, NCM532 or NCM523, and NCM433 can be used in a mixture in the range of 9:1 to 1:9 (in a typical example, 2:1), or NCM532 or NCM523, and $LiMnO_2$, $LiCoO_2$, or $LiMn_2O_4$ can be used in a mixture in the range of 9:1 to 1:9.

The synthesis method for the lithium composite metal oxides represented by the above formulas is not limited, and known synthesis methods for oxides can be applied.

One of the positive electrode active materials may be used singly, or two or more thereof may be used in combination.

For the purpose of lowering the impedance, a conductive aid may be added to the positive electrode active material layer comprising the positive electrode active material. Examples of the conductive aid include graphites such as natural graphite and artificial graphite, and carbon blacks such as acetylene black, Ketjen black, furnace black, channel black, and thermal black. More than one of the conductive aids may be appropriately used in a mixture. The amount of the conductive aid is preferably 1 to 10% by mass based on 100% by mass of the positive electrode active material.

The binder for positive electrodes is not limited, and examples thereof include polyvinylidene fluorides, vinylidene fluoride-hexafluoropropylene copolymers, and vinylidene fluoride-tetrafluoroethylene copolymers. Alternatively, styrene-butadiene copolymer rubber, polytetrafluoroethylene, polypropylene, polyethylene, polyimide, or polyamideimide, etc., may be used for the binder for positive electrodes. In particular, polyvinylidene fluoride is preferably used for the binder for positive electrodes, from the viewpoint of versatility and low cost. The amount of the binder for positive electrodes to be used is, from the viewpoint of "sufficient binding strength" and "higher energy", which are in trade-off relation to the amount of the binder, preferably 2 to 10 parts by mass based on 100 parts by mass of the positive electrode active material.

Any common positive electrode current collector can be used, and, for example, an aluminum foil, a lath sheet of a stainless steel, or the like can be used.

To produce the positive electrode, for example, the positive electrode active material, the binder, and, as necessary, an aid such as the conductive aid are mixed together and a solvent such as N-methylpyrrolidone is added thereto and the resultant is kneaded to prepare a slurry, and the slurry is applied onto a current collector by using a doctor blade method, a die coater method, or the like, and then dried and pressurized as necessary.

<Nonaqueous Electrolytic Solution>

The nonaqueous electrolytic solution in the lithium ion secondary battery according to an exemplary embodiment comprises a nonaqueous solvent and an electrolyte. Preferably, the nonaqueous electrolytic solution further comprises lithium difluorophosphate as an additive.

(Nonaqueous Solvent)

Examples of the nonaqueous solvent include a cyclic carbonate, a linear carbonate, a linear ester, a lactone, an ether, a sulfone, a nitrile, and a phosphate, and a cyclic carbonate and a linear carbonate are preferred.

Specific examples of the cyclic carbonate include propylene carbonate, ethylene carbonate, butylene carbonate, vinylene carbonate, and vinylethylene carbonate.

Specific examples of the linear carbonate include dimethyl carbonate, diethyl carbonate, dipropyl carbonate, dibutyl carbonate, ethyl methyl carbonate, methyl propyl carbonate, methyl isopropyl carbonate, and methyl butyl carbonate.

Specific examples of the linear ester include methyl formate, methyl acetate, methyl propionate, ethyl propionate, methyl pivalate, and ethyl pivalate.

Specific examples of the lactone include γ-butyrolactone, δ-valerolactone, and α-methyl-γ-butyrolactone.

Specific examples of the ether include tetrahydrofuran, 2-methyltetrahydrofuran, 1,3-dioxolane, 1,3-dioxane, 1,4-dioxane, 1,2-dimethoxyethane, 1,2-diethoxyethane, and 1,2-dibutoxyethane.

Specific examples of the sulfone include sulfolane, 3-methylsulfolane, and 2,4-dimethylsulfolane.

Specific examples of the nitrile include acetonitrile, propionitrile, succinonitrile, glutaronitrile, and adiponitrile.

Specific examples of the phosphate include trimethyl phosphate, triethyl phosphate, tributyl phosphate, and trioctyl phosphate.

One of the above nonaqueous solvents may be used singly, or two or more thereof may be used in combination. Examples of the combination of a plurality of nonaqueous solvents include a combination of a cyclic carbonate and a linear carbonate, and a combination of a cyclic carbonate and a linear carbonate with addition of a linear ester, a lactone, an ether, a nitrile, a sulfone, or a phosphate as a third solvent. Especially, it is preferable for achievement of excellent battery characteristics that the nonaqueous solvent at least comprises a cyclic carbonate and a linear carbonate.

Further, a fluorinated ether solvent, a fluorinated carbonate solvent, or a fluorinated phosphate, etc., as a third solvent, may be added to a combination of a cyclic carbonate and a linear carbonate.

Specific examples of the fluorinated ether solvent include $CF_3OCH_3$, $CF_3OC_2H_5$, $F(CF_2)_2OCH_3$, $F(CF_2)_2OC_2H_5$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $H(CF_2)_4CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $CF_3CHFCF_2CH_2OCH_2CF_2CF_3$, $H(CF_2)_2CH_2OCF_2CHFCF_3$, $CHF_2CH_2OCF_2CFHCF_3$, $F(CF_2)_2CH_2OCF_2CFHCF_3$, $CF_3(CF_2)_3OCHF_2$.

Examples of the fluorinated carbonate solvent include fluoroethylene carbonate, fluoromethyl methyl carbonate, 2-fluoroethyl methyl carbonate, ethyl-(2-fluoroethyl) carbonate, (2,2-difluoroethyl) ethyl carbonate, bis(2-fluoroethyl) carbonate, and ethyl-(2,2,2-trifluoroethyl) carbonate.

Examples of the fluorinated phosphate include tris(2,2,2-trifluoroethyl) phosphate, tris(trifluoromethyl) phosphate, and tris(2,2,3,3-tetrafluoropropyl) phosphate.

(Electrolyte)

Specific examples of the electrolyte include lithium salts such as lithium hexafluorophosphate ($LiPF_6$), lithium bis(fluorosulfonyl)imide [$LiN(SO_2F)_2$], $LiBF_4$, $LiClO_4$, $LiN(SO_2CF_3)_2$, $LiN(SO_2C_2F_5)_2$, $CF_3SO_3Li$, $C_4F_9SO_3Li$, $LiAsF_6$, $LiAlCl_4$, $LiSbF_6$, $LiPF_4(CF_3)_2$, $LiPF_3(C_2F_5)_3$, $LiPF_3(CF_3)_3$, $(CF_2)_2(SO_2)_2Li$, $(CF_2)_3(SO_2)_2Li$, lithium bis(oxalate)borate, and lithium difluoro(oxalato)borate. One of these lithium salts may be used singly, or two or more thereof may be used in combination.

Among these electrolytes, it is particularly preferable that $LiPF_6$ (lithium hexafluorophosphate) and $LiN(SO_2F)_2$ (lithium bis(fluorosulfonyl)imide) be contained. Use of an electrolytic solution containing $LiN(SO_2F)_2$ can enhance charge rate characteristics. On the other hand, use of an electrolytic solution containing $LiN(SO_2F)_2$ singly disadvantageously causes the corrosion of aluminum in a current collector of a positive electrode. Therefore, use of both $LiPF_6$ and $LiN(SO_2F)_2$ as the electrolyte is preferred, and the concentration of $LiPF_6$ in the electrolytic solution in this case is more preferably 0.3 mol/L (M) or more. By virtue of this, the corrosion of aluminum can be prevented while high charge rate characteristics are maintained. In using $LiN(SO_2F)_2$, the concentration of $LiN(SO_2F)_2$ in the electrolytic solution is, from the viewpoint of achieving a sufficient effect of addition, preferably 0.1 mol/L or more, and more preferably 0.2 mol/L or more, and, from the viewpoint of preventing the corrosion of aluminum, preferably 1.7 mol/L or less, more preferably 1.5 mol/L or less, and even more preferably 1.0 mol/L or less.

The concentration of the electrolyte dissolving in the nonaqueous solvent solution in the nonaqueous electrolytic solution is preferably within the range of 0.3 to 3 mol/L, and more preferably within the range of 0.5 to 2 mol/L. If the concentration of the electrolyte is 0.3 mol/L or more, a more sufficient ion conductivity can be achieved; and if the concentration of the electrolyte is 3 mol/L or less, increase in the viscosity of the electrolytic solution can be reduced, and a more sufficient ion mobility and impregnating ability can be achieved.

Preferably, the nonaqueous electrolytic solution further contains lithium difluorophosphate as an additive to enhance charge rate characteristics. Although details of the reason for enhancement of charge rate characteristics by lithium difluorophosphate contained in the nonaqueous electrolytic solution are unclear, it is inferred, for example, that a low-resistance coating film derived from lithium difluorophosphate is formed on the surface of a positive electrode active material in initial stages of charging, and the low-resistance coating film provides an enhanced charge rate. The content of lithium difluorophosphate in the nonaqueous electrolytic solution is preferably 0.05% by mass to 10% by mass, more preferably 0.05% by mass to 5% by mass, and even more preferably 0.1% by mass to 5% by mass.

<Separator>

The separator is not limited, and a monolayer or multilayer porous film containing a resin material such as a polyolefin including polypropylenes and polyethylenes or a nonwoven fabric can be used. In addition, a film in which a resin layer of a polyolefin or the like is coated with a different type of a material or the different type of a material is laminated on the resin layer can be used. Examples of such films include a film in which a polyolefin base material is coated with a fluorine compound or an inorganic fine particle, and a film in which a polyolefin base material and an aramid layer are laminated.

The thickness of the separator is preferably 5 to 50 μm, and more preferably 10 to 40 μm in terms of the energy density and mechanical strength of a battery.

<Structure of Lithium Ion Secondary Battery>

The form of the lithium ion secondary battery is not limited, and examples thereof include a coin battery, a button battery, a cylindrical battery, a rectangular battery, and a laminate battery.

For example, a laminate battery can be produced as follows: a positive electrode, a separator, and a negative electrode are laminated alternately to form a laminate; a metal terminal called tab is connected to each electrode; the resultant is contained in a container composed of a laminate film, as an outer package; and an electrolytic solution is injected thereinto and the container is sealed.

For the laminate film, any laminate film which is stable in an electrolytic solution and has sufficient water vapor barrier properties can be appropriately selected. For such a laminate film, for example, a laminate film including a polyolefin (e.g., a polypropylene, a polyethylene) coated with an inorganic material such as aluminum, silica, and alumina can be used. In particular, an aluminum laminate film including a polyolefin coated with aluminum is preferred from the viewpoint of suppression of volume expansion.

Representative examples of layer configurations for the laminate film include a configuration in which a metal thin film layer and a heat-sealable resin layer are laminated. Other examples of layer configurations for the laminate film include a configuration in which a resin film (protective layer) containing a polyester such as a polyethylene terephthalate or a polyamide such as a nylon is further laminated on the surface of a metal thin film layer in the side opposite to a heat-sealable resin layer. In the case that a container including a laminate film containing a laminate including a positive electrode and a negative electrode is sealed, a container is formed so that the heat-sealable resin layers of the laminate film face each other to allow the heat-sealable resin layers to fuse at a portion for sealing. For the metal thin film layer of the laminate film, for example, a foil of Al, Ti, a Ti alloy, Fe, a stainless steel, a Mg alloy, or the like with a thickness of 10 to 100 μm is used. The resin used for the heat-sealable resin layer is not limited and may be any resin capable of being heat-sealed, and examples thereof include: polypropylenes, polyethylenes, and acid-modified products of them; polyphenylene sulfides; polyesters such as polyethylene terephthalates; polyamides; and ionomer resins in which an ethylene-vinyl acetate copolymer, an ethylene-methacrylic acid copolymer, or an ethylene-acrylic acid copolymer are intermolecularly linked with a metal ion. The thickness of the heat-sealable resin layer is preferably 10 to 200 μm, and more preferably 30 to 100 μm.

FIG. 1 illustrates one example of the structure of the lithium ion secondary battery according to an exemplary embodiment.

Positive electrode active material layers 1 comprising a positive electrode active material are formed on positive electrode current collectors 1A to constitute positive electrodes. For the positive electrodes are used a single-sided electrode in which a positive electrode active material layer 1 is formed on the surface in one side of a positive electrode current collector 1A, and a double-sided electrode in which a positive electrode active material layer 1 is formed on the surface in each side of a positive electrode current collector 1A.

Negative electrode active material layers 2 comprising a negative electrode active material are formed on negative electrode current collectors 2A to constitute negative electrodes. For the negative electrodes are used a single-sided electrode in which a negative electrode active material layer 2 is formed on the surface in one side of a negative electrode current collector 2A, and a double-sided electrode in which a negative electrode active material layer 2 is formed on the surface in each side of a negative electrode current collector 2A.

These positive electrodes and negative electrodes are disposed opposite to each other via separators 3, as illustrated in FIG. 1, and laminated. The two positive electrode current collectors 1A connect to each other in one end side, and to the connection a positive electrode tab 1B is connected. The two negative electrode current collectors 2A connect to each other in another end side, and to the connection a negative electrode tab 2B is connected. The laminate including the positive electrodes and the negative electrodes (power generation element) is contained in an outer package 4, and impregnated with an electrolytic solution. The positive electrode tab 1B and the negative electrode tab 2B protrude out of the outer package 4. The outer package 4 is formed in such a way that two rectangle laminate sheets as the outer package 4 are stacked so as to wrap the power generation element and the four edge portions are fused for sealing.

EXAMPLE

Hereinafter, the present invention will be described in more detail with reference to Synthesis Examples, an analysis example, and Examples, but the present invention is never limited to these examples.

Synthesis Example 1: Lithium Fluorophosphate Compound-Coated Graphite Material 1

A natural graphite powder (spherical graphite) with an average particle diameter of 20 μm and a specific surface area of 5 m$^2$/g was subjected to heat treatment in air at 480° C. for 1 hour (first heat treatment) to afford a graphite particle. Subsequently, 0.4 g of lithium difluorophosphate was dissolved in 40 mL of acetonitrile, and 40 g of the graphite particle was added thereto. The acetonitrile was distilled off by using an evaporator, and the resulting graphite particle was heated under nitrogen flow at 200° C. for 1 hour to afford a lithium fluorophosphate compound-coated graphite material 1.

Synthesis Example 2: Lithium Fluorophosphate Compound-Coated Graphite Material 2

A lithium fluorophosphate compound-coated graphite material 2 was prepared in the same manner as in Synthesis Example 1 except that 0.2 g of lithium difluorophosphate was used in place of 0.4 g of lithium difluorophosphate.

Synthesis Example 3: Lithium Fluorophosphate Compound-Coated Graphite Material 3

A lithium fluorophosphate compound-coated graphite material 3 was prepared in the same manner as in Synthesis Example 1 except that 0.8 g of lithium difluorophosphate was used in place of 0.4 g of lithium difluorophosphate.

Synthesis Example 4: Lithium Fluorophosphate Compound-Coated Graphite Material 4

A lithium fluorophosphate compound-coated graphite material 4 was prepared in the same manner as in Synthesis Example 1 except that the natural graphite powder (spherical graphite) with an average particle diameter of 20 μm and a specific surface area of 5 $m^2/g$ was not subjected to heat treatment (first heat treatment).

(XPS Analysis of Lithium Fluorophosphate Compound-Coated Graphite Materials)

The surface elemental composition of each of the graphite materials obtained in Synthesis Examples 1 to 3 was determined with X-ray photoelectron spectroscopy (XPS). The elemental compositions (atomic %) are summarized in Table 1, and the atomic ratios of elements to lithium atoms in Table 2. For comparison, results of XPS analysis for lithium difluorophosphate are also shown.

The results for the atomic ratios to lithium atoms in Table 2 show that F/Li was approximately 3 for each of the lithium fluorophosphate compound-coated graphite materials in Synthesis Examples, and approximately 2 for the lithium difluorophosphate used for film formation, revealing that, in each of the lithium fluorophosphate compound-coated graphite materials in Synthesis Examples, lithium difluorophosphate reacted on the surface of the graphite particle to form a coating film in chemical condition with a composition differing from that of the lithium difluorophosphate used for film formation. Each of the coating films is inferred to contain a compound with the composition $LiPO_3F_3$ as a reaction product of lithium difluorophosphate formed on the surface of graphite.

It is understood from Table 1 that the mean composition of each coating film formed on the surface of graphite can be represented as $LiPO_aF_b$. In the composition formula $LiPO_aF_b$, a and b correspond to O/Li and F/Li, respectively, in Table 2, and can be determined through normalization based on the results of XPS analysis for lithium difluorophosphate ($LiPO_2F_2$) as follows.

Synthesis Example 1

$a$ (O/Li)=2.91×(2/2.28)=2.55

$b$ (F/Li)=3.05×(2/2.21)=2.76

Synthesis Example 2

$a$ (O/Li)=3.22×(2/2.28)=2.82

$b$ (F/Li)=2.94×(2/2.21)=2.66

Synthesis Example 3

$a$ (O/Li)=3.34×(2/2.28)=2.93

$b$ (F/Li)=3.17×(2/2.21)=2.87

The apparatus and setting conditions for the XPS measurement were as follows.

XPS apparatus: Quantera SXM (produced by ULVAC-PHI, Inc.)

X-ray for excitation: monochromatic Al K$α_{1,2}$ ray (1486.6 eV)

X-ray spot size: 200 μm

Take-off angle of photoelectrons: 45° (the inclination of a detector to the surface of a sample)

Narrow Scan Analysis

TABLE 1

Results of XPS analysis: elemental composition (atomic %)

| Synthesis Example | Li | C | O | F | P |
|---|---|---|---|---|---|
| 1 | 2.6 | 79.4 | 7.5 | 7.9 | 2.7 |
| 2 | 1.4 | 88.6 | 4.5 | 4.1 | 1.5 |
| 3 | 2.4 | 79.6 | 7.9 | 7.5 | 2.6 |
| $LiPO_2F_2$ | 15.3 | | 33.9 | 34.9 | 15.9 |

TABLE 2

Results of XPS analysis: atomic ratios to lithium atoms

| Synthesis Example | F/Li | P/Li | O/Li | Li/Li |
|---|---|---|---|---|
| 1 | 3.05 | 1.04 | 2.91 | 1.0 |
| 2 | 2.94 | 1.04 | 3.22 | 1.0 |
| 3 | 3.17 | 1.11 | 3.34 | 1.0 |
| $LiPO_2F_2$ | 2.21 | 1.04 | 2.28 | 1.0 |

Example 1

<Production Example of Positive Electrode>

$LiCo_{1/3}Ni_{1/3}Mn_{1/3}O_2$ as a positive electrode active material, carbon black as a conductive aid, and polyvinylidene fluoride (PVDF) as a binder for positive electrodes were weighed at a mass ratio of 94:3:3 (active material:conductive aid:PVDF), and they were mixed with N-methylpyrrolidone to prepare a positive electrode slurry. The positive electrode slurry was applied onto one surface of a positive electrode current collector 1A including an aluminum foil with a thickness of 20 μm, and the resultant was dried and further pressed to form a positive electrode active material layer 1. In the same manner, the positive electrode active material layer 1 was formed on another surface of the positive electrode current collector 1A, and thus a double-sided electrode with a positive electrode active material layer formed on each side of a positive electrode current collector was obtained.

<Production Example of Negative Electrode>

The graphite material 1 obtained in Synthesis Example 1, as a negative electrode active material, and polyvinylidene fluoride (PVDF) were mixed together with a mass ratio of 94:6 (graphite material:PVDF), and N-methylpyrrolidone was added thereto to prepare a slurry. The slurry was applied onto one surface of a negative electrode current collector 2A including a copper foil (thickness: 10 μm), and the resultant was dried to form a negative electrode active material layer 2, and thus a single-sided negative electrode with a negative electrode active material layer formed on one surface of a negative electrode current collector was obtained.

In the same manner, the negative electrode active material layer 2 was formed in each side of the negative electrode current collector 2A, and thus a double-sided electrode with a negative electrode active material layer formed on each side of a negative electrode current collector was obtained.

<Preparation of Nonaqueous Electrolytic Solution>

Ethylene carbonate (EC), dimethyl carbonate (DMC), and methyl ethyl carbonate (MEC) were mixed together at a volume ratio (EC/DMC/MEC) of 20/40/40, and $LiPF_6$ and LiN(SO$_2$F)$_2$ (abbreviated as "LiFSI") were dissolved therein to concentrations of 0.65 mol/L and 0.65 mol/L, respectively, moreover, lithium difluorophosphate was dissolved therein to contents of 1% by mass, to prepare a nonaqueous electrolytic solution.

<Production of Lithium Ion Secondary Battery>

The positive electrode and negative electrode produced in the above methods were shaped into a predetermined shape, and they were laminated with a porous film separator 3 sandwiched therebetween, and a positive electrode tab 1B and a negative electrode tab 2B were welded to the respective electrodes to obtain a power generation element. The power generation element was wrapped with an outer package including an aluminum laminate films 4, and the three edge portions were heat-sealed, and then the above nonaqueous electrolytic solution was injected thereinto for impregnation at an appropriate degree of vacuum. Thereafter, the residual one edge portion was heat-sealed under reduced pressure to obtain a pre-activated lithium ion secondary battery having the structure illustrated in FIG. 1.

<Step of Activation Treatment>

The pre-activated lithium ion secondary battery produced was subjected to two cycles repeatedly each of which consists of charging to 4.2 V at a current per gram of the positive electrode active material of 20 mA/g, and discharging to 2.5 V at an identical current per gram of the positive electrode active material of 20 mA/g. Thus, a lithium ion secondary battery of the present Example was obtained.

Example 2

A lithium ion secondary battery was produced in the same manner as in Example 1 except that a negative electrode using the graphite material 2 obtained in Synthesis Example 2 was used in place of the negative electrode using the graphite material 1 obtained in Synthesis Example 1.

Example 3

A lithium ion secondary battery was produced in the same manner as in Example 1 except that a negative electrode using the graphite material 3 obtained in Synthesis Example 3 was used in place of the negative electrode using the graphite material 1 obtained in Synthesis Example 1.

Example 4

A lithium ion secondary battery was produced in the same manner as in Example 1 except that a negative electrode using the graphite material 4 obtained in Synthesis Example 4 was used in place of the negative electrode using the graphite material 1 obtained in Synthesis Example 1, and that a nonaqueous solvent as a mixture of EC and MEC at a volume ratio (EC/MEC) of 30/70 was used in place of the nonaqueous solvent as a mixture of EC, DMC, and MEC.

Example 5

A lithium ion secondary battery was produced in the same manner as in Example 1 except that 0.5 mol/L of LiPF$_6$ and 0.5 mol/L of LiN(SO$_2$F)$_2$ were added as the electrolyte in place of 0.65 mol/L of LiPF$_6$ and 0.65 mol/L of LiN(SO$_2$F)$_2$, and that a nonaqueous solvent as a mixture of EC and MEC at a volume ratio (EC/MEC) of 30/70 was used in place of the nonaqueous solvent as a mixture of EC, DMC, and MEC.

Example 6

A lithium ion secondary battery was produced in the same manner as in Example 1 except that 0.3 mol/L of LiPF$_6$ and 0.7 mol/L of LiN(SO$_2$F)$_2$ were added as the electrolyte in place of 0.65 mol/L of LiPF$_6$ and 0.65 mol/L of LiN(SO$_2$F)$_2$, and that a nonaqueous solvent as a mixture of EC and MEC at a volume ratio (EC/MEC) of 30/70 was used in place of the nonaqueous solvent as a mixture of EC, DMC, and MEC.

Example 7

A lithium ion secondary battery was produced in the same manner as in Example 1 except that 0.2% by mass of lithium difluorophosphate was dissolved as the additive in the electrolytic solution in place of 1% by mass of lithium difluorophosphate.

Comparative Example 1

A lithium ion secondary battery was produced in the same manner as in Example 1 except that a graphite material not coated with a lithium fluorophosphate compound (a graphite particle obtained by heat treatment of a natural graphite powder (spherical graphite) with an average particle diameter of 20 μm and a specific surface area of 5 m$^2$/g in air at 480° C. for 1 hour) was used for the negative electrode in place of the graphite material obtained in Synthesis Example 1.

Comparative Example 2

A lithium ion secondary battery was produced in the same manner as in Example 1 except that a graphite material not subjected to the first heat treatment and not coated with a lithium fluorophosphate compound (a natural graphite powder (spherical graphite) with an average particle diameter of 20 μm and a specific surface area of 5 m$^2$/g) was used for the negative electrode in place of the graphite material obtained in Synthesis Example 1.

<Evaluation Method for Lithium Ion Secondary Battery>

Each of the above lithium ion batteries was charged to 4.2 V at a constant current of 0.1 C and discharged to 2.5 V at a constant current of 0.1 C in a thermostat bath kept at 20° C. to determine the discharge capacity at 0.1 C after the first cycle. Subsequently, each of the above lithium ion batteries was charged to 4.2 V at a constant current of 6 C and discharged to 2.5 V at a constant current of 0.1 C. Subsequently, each of the above lithium ion batteries was charged to 4.2 V at a constant current of 10 C and discharged to 2.5 V at a constant current of 0.1 C. From the ratios of each of the thus-acquired charge capacity at 6 C and charge capacity at 10 C to the charge capacity at 0.1 C, the charge rate characteristics were determined by using the following formulas.

Charge rate characteristics (%) at 6 C=(charge capacity in charging at 6 C/charge capacity in charging at 0.1 C)×100

Charge rate characteristics (%) at 10 C=(charge capacity in charging at 10 C/charge capacity in charging at 0.1 C)×100

<Evaluation Results for Lithium Ion Secondary Batteries>

The graphite materials used for the negative electrode, compositions of electrolytic solutions, additives, and evaluation results (charge rate characteristics) for Examples and Comparative Examples are summarized in Table 3.

From comparison of Examples 1 to 7 and Comparative Examples 1 and 2, it is understood that lithium ion secondary batteries with a lithium fluorophosphate compound-coated graphite material had excellent charge rate characteristics.

TABLE 3

| | Graphite material used for negative electrode | Nonaqueous solvent Electrolyte | Additive | Charge rate at 6 C[1] | Charge rate at 10 C[2] |
|---|---|---|---|---|---|
| Example 1 | Graphite material obtained in Synthesis Example 1 | EC/DMC/MEC (20/40/40) 0.65M LiPF$_6$ + 0.65M LiFSI | LiPO$_2$F$_2$ 1 wt % | 83 | 72 |
| Example 2 | Graphite material obtained in Synthesis Example 2 | EC/DMC/MEC (20/40/40) 0.65M LiPF$_6$ + 0.65M LiFSI | LiPO$_2$F$_2$ 1 wt % | 81 | 72 |
| Example 3 | Graphite material obtained in Synthesis Example 3 | EC/DMC/MEC (20/40/40) 0.65M LiPF$_6$ + 0.65M LiFSI | LiPO$_2$F$_2$ 1 wt % | 82 | 71 |
| Example 4 | Graphite material obtained in Synthesis Example 4 | EC/MEC (30/70) 0.65M LiPF$_6$ + 0.65M LiFSI | LiPO$_2$F$_2$ 1 wt % | 80 | 69 |
| Example 5 | Graphite material obtained in Synthesis Example 1 | EC/MEC (30/70) 0.5M LiPF$_6$ + 0.5M LiFSI | LiPO$_2$F$_2$ 1 wt % | 82 | 71 |
| Example 6 | Graphite material obtained in Synthesis Example 1 | EC/MEC (30/70) 0.3M LiPF$_6$ + 0.7M LiFSI | LiPO$_2$F$_2$ 1 wt % | 83 | 71 |
| Example 7 | Graphite material obtained in Synthesis Example 1 | EC/DMC/MEC (20/40/40) 0.65M LiPF$_6$ + 0.65M LiFSI | LiPO$_2$F$_2$ 0.2 wt % | 82 | 71 |
| Comparative Example 1 | Heat-treated graphite material not coated with lithium fluorophosphate compound | EC/DMC/MEC (20/40/40) 0.65M LiPF$_6$ + 0.65M LiFSI | LiPO$_2$F$_2$ 1 wt % | 74 | 65 |
| Comparative Example 2 | Graphite material not coated with lithium fluorophosphate compound | EC/DMC/MEC (20/40/40) 0.65M LiPF$_6$ + 0.65M LiFSI | LiPO$_2$F$_2$ 1 wt % | 72 | 62 |

[1](charge capacity in charging at 6 C/charge capacity in charging at 0.1 C) × 100
[2](charge capacity in charging at 10 C/charge capacity in charging at 0.1 C) × 100

"Charge rate at 6 C" and "Charge rate at 10 C" in Table 3 indicate charge rate characteristics at 6 C and rate characteristics at 10 C, respectively, determined by using the following formulas.

Charge rate characteristics (%) at 6 C=(charge capacity in charging at 6 C/charge capacity in charging at 0.1 C)×100

Charge rate characteristics (%) at 10 C=(charge capacity in charging at 10 C/charge capacity in charging at 0.1 C)×100

"LiFSI" in Table 3 indicates LiN(SO$_2$F)$_2$.

In the foregoing, the present invention has been described with reference to the exemplary embodiments and the Examples; however, the present invention is not limited to the exemplary embodiments and the Examples. Various modifications understandable to those skilled in the art may be made to the constitution and details of the present invention within the scope thereof.

INDUSTRIAL APPLICABILITY

A lithium ion secondary battery using the graphite material according to an exemplary embodiment has excellent charge rate characteristics, and thus can be utilized for all industrial fields requiring a power supply, and industrial fields relating to transportation, storage, and supply of electrical energy. Specifically, utilized for, for example, a power supply for mobile devices such as cellular phones, notebook computers, tablet terminals, and portable game machines; a power supply for travel/transport means such as electrical vehicles, hybrid cars, electric motorcycles, power-assisted bicycles, transport carts, robots, and drones (unmanned aerial vehicles); an electrical storage system for household use; a power supply for backup such as a UPS; and electrical storage equipment to store power generated through photovoltaic power generation, wind power generation, or the like.

REFERENCE SIGNS LIST

1: positive electrode active material layer
1A: positive electrode current collector
1B: positive electrode tab
2: negative electrode active material layer
2A: negative electrode current collector
2B: negative electrode tab
3: separator
4: outer package

The invention claimed is:
1. A graphite-based material for a lithium ion secondary battery, the graphite-based material comprising a coating film on at least a part of the surface of a graphite particle,
the coating film comprising a lithium fluorophosphate compound having a mean composition represented by the following composition formula:

$$LiPO_aF_b$$

wherein a and b are, independently of each other, numbers satisfying 2<a≤3 and 2<b≤3, respectively.
2. The graphite-based material for a lithium ion secondary battery according to claim 1, wherein a and b in the composition formula are each independently in the range of 2.1 to 3.

3. The graphite-based material for a lithium ion secondary battery according to claim 1, wherein a and b in the composition formula are each independently in the range of 2.5 to 3.

4. The graphite-based material for a lithium ion secondary battery according to claim 1, wherein composition of a particle of the graphite-based material as determined by surface analysis using X-ray photoelectron spectroscopy (XPS) is such that:
when a total amount of element lithium (Li), element phosphorus (P), element fluorine (F), element oxygen (O), and element carbon (C) is defined as 100 atomic %,
a ratio of C is 93.6 atomic % or less.

5. The graphite-based material for a lithium ion secondary battery according to claim 1, wherein composition of a particle of the graphite-based material as determined by surface analysis using X-ray photoelectron spectroscopy (XPS) is such that:
when a total amount of element lithium (Li), element phosphorus (P), element fluorine (F), element oxygen (O), and element carbon (C) is defined as 100 atomic %,
a ratio of Li is 0.7 to 3.5 atomic %,
a ratio of P is 0.7 to 3.5 atomic %,
a ratio of F is 2.5 to 10 atomic %, and
a ratio of O is 2.5 to 10 atomic %.

6. The graphite-based material for a lithium ion secondary battery according to claim 1, wherein the graphite particle is a heat-treated graphite particle.

7. A negative electrode for a lithium ion secondary battery, the negative electrode comprising the graphite-based material according to claim 1.

8. A lithium ion secondary battery comprising: a positive electrode comprising a positive electrode active material capable of intercalating and deintercalating a lithium ion; a negative electrode comprising a negative electrode active material capable of intercalating and deintercalating a lithium ion; and a nonaqueous electrolytic solution, wherein the negative electrode active material comprises the graphite-based material according to claim 1.

9. The lithium ion secondary battery according to claim 8, wherein the nonaqueous electrolytic solution comprises lithium hexafluorophosphate and lithium bis(fluorosulfonyl) imide as an electrolyte, and comprises lithium difluorophosphate as an additive.

* * * * *